April 12, 1927.

R. W. POINDEXTER, JR., ET AL 1,624,147

PROCESS OF PREPARING ALKALI METAL CYANIDES

Filed April 17, 1926

INVENTOR
Robert W. Poindexter Jr. and
Paul T. Dolley
BY
ATTORNEYS

Patented Apr. 12, 1927.

1,624,147

UNITED STATES PATENT OFFICE.

ROBERT W. POINDEXTER, JR., OF LOS ANGELES, AND PAUL T. DOLLEY, OF LOS ANGELES COUNTY, CALIFORNIA, ASSIGNORS TO CALIFORNIA CYANIDE COMPANY, INCORPORATED, OF NEW YORK, N. Y., A CORPORATION OF DELAWARE.

PROCESS OF PREPARING ALKALI-METAL CYANIDES.

Application filed April 17, 1926. Serial No. 102,612.

This invention relates to the production of high grade alkali metal cyanides by causing hydrocyanic acid to react with alkali metal carbonates.

It has been known for a long time that hydrocyanic acid can be made to react, to a limited extent, with sodium carbonate in aqueous solution. Thus, if hydrocyanic acid be added to a solution of an alkali metal carbonate or if gaseous hydrocyanic acid be bubbled into such a solution, a certain amount of alkali metal cyanide will be formed. However, such reactions are far from complete and do not offer a satisfactory method of preparing alkali metal cyanides in solid form. To the fact that the reaction is incomplete is added the difficulty that a large amount of the hydrocyanic acid polymerizes and the further well-known difficulty of satisfactorily evaporating solutions of sodium cyanide.

The production of alkali metal cyanides, by passing hydrocyanic acid over an alkali metal compound, such as the carbonate, at a temperature of 200 to 500° C., has also been suggested. Certain difficulties appear, however, when an attempt is made to carry out this reaction and these difficulties have prevented the successful commercial development of the process of producing cyanides from the alkali metal carbonates. In particular, it has been difficult or impossible to produce cyanides of high purity by the process described.

It is the object of the present invention to provide a successful and commercially practicable process of producing alkali metal cyanides in solid form.

Other objects and advantages of the invention will be apparent as it is better understood by reference to the following specification and accompanying drawing, in which—

Figure 1:
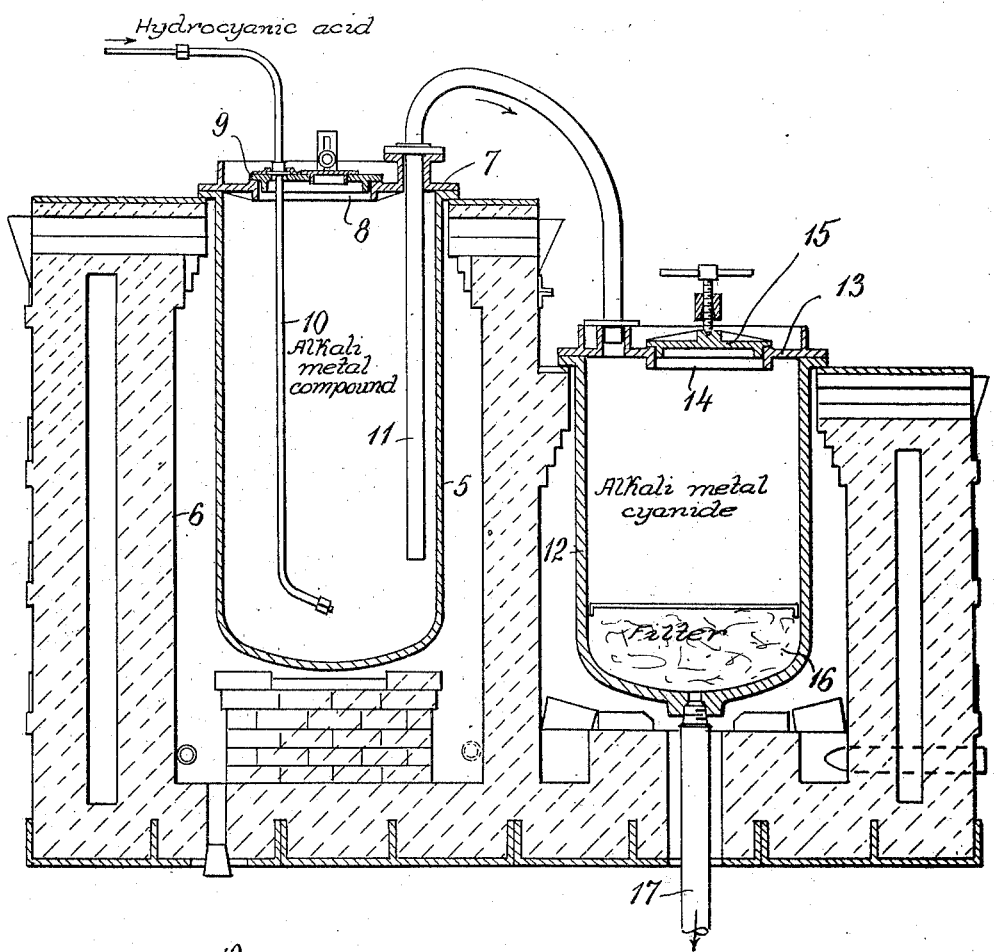
Figure 2:
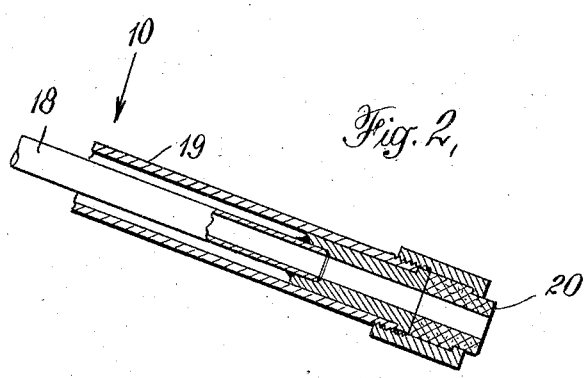

Fig. 1 is a vertical section through an apparatus adapted for use in the practice of the invention; and Fig. 2 is an enlarged sectional view of the inlet through which hydrocyanic acid is introduced into the converter.

We have discovered that it is possible to produce alkali metal cyanides of a high degree of purity by passing hydrocyanic acid into a fused mixture of alkali metal salts in which carbonates predominate. Hydrocyanic acid is very rapidly absorbed by alkali metal carbonates in such fused baths. The composition of the bath used may be varied widely so long as it contains one or more alkali metal carbonates as its active constituents. It is, in fact, very desirable to use a bath containing other constituents rather than a bath composed entirely of a single alkali metal carbonate such as sodium carbonate or potassium carbonate. The reason for this is that the final production of alkali metal cyanide proceeds with good efficiency when the temperature of the melted material during the introduction of the hydrocyanic acid is maintained at a comparatively low point. It is, in fact, desirable to maintain the temperature at as low a point as will permit the bath to remain fluid. It is possible, nevertheless, to operate with a bath of a slightly pasty consistency so long as the hydrocyanic acid can bubble into it and thereby maintain a reasonable degree of mixing. We have found a temperature of 550 to 650° C. satisfactory when the melt consists of a mixture of sodium carbonate and sodium cyanide. The process will operate satisfactorily at higher temperatures but the efficiency, based on HCN used, will be somewhat lower. Under certain conditions a troublesome foaming of the bath takes place. We have observed that this is invariably due to impurities in the bath and, in particular, to suspended particles of solid matter such as carbon. Such particles tend to rise as a foam and if this foam be skimmed from the top of the bath this trouble is thereby eliminated.

The addition of other salts to a single alkali metal carbonate may be made for the purpose of reducing the temperature of fusion. It is frequently advantageous to add, as a primer, a certain amount of the cyanide of the same alkali metal whose carbonate it is desired to convert to cyanide. Thus, when using sodium carbonate, approximately 20% of sodium cyanide may advantageously be added, since such addition may greatly reduce the melting point of the sodium carbonate. The sodium cyanide used for this purpose will, of course, appear in the finished product and will not have the effect of reducing its purity. Other salts, such as sodium chloride, may be used in case a finished product containing, for instance, sodium chloride is desired. Or the hydroxide of the alkali metal whose carbonate it is desired to convert, may be added for the purpose of reducing the melting point of the carbonate. In case a hydroxide is used, it will also be converted to cyanide and therefore, will not lower the purity of the final product. Or a mixture of alkali metal carbonates such as sodium carbonate and potassium carbonate may be used, since such a mixture fuses at a lower temperature than either single constituent.

When hydrocyanic acid is added to an alkali metal carbonate under conditions such as those described, several reactions take place. The principal reaction is the direct production of alkali metal cyanide, for example, in the case of sodium carbonate:

$$Na_2CO_3 + 2HCN \rightarrow 2NaCN + H_2O + CO_2$$

Secondary reactions may then take place; thus the water, resulting from the first reaction, may react with sodium cyanide to form sodium formate and ammonia:

$$NaCN + 2H_2O \rightarrow HCOONa + NH_3$$

The ammonia so formed may then react with a further amount of sodium carbonate to produce sodium cyanate, sodium hydroxide and water in accordance with the following reaction:

$$Na_2CO_3 + NH_3 \rightarrow NaCNO + NaOH + H_2O$$

A further reaction which may occur is the decomposition of sodium cyanate into sodium cyanamid and carbon dioxide as follows:

$$2NaCNO \rightarrow Na_2CN_2 + CO_2$$

In addition to the reactions mentioned, we have observed the formation of sodium ferrocyanide, when using iron or steel melting pots or pots composed of an alloy which contains iron. We do not know the exact manner in which this latter reaction takes place, but it is apparent that the melting pot itself or the sheath of the HCN inlet pipe is the source of the iron which enters into the reaction.

From the above it will be seen that the reaction between an alkali metal carbonate and hydrocyanic acid is somewhat complicated. Fortunately, however, each of the three substances formed in addition to sodium cyanide, namely sodium cyanate, sodium cyanamid and sodium ferrocyanide, may be easily converted into sodium cyanide. Thus, it is well known that sodium cyanate will react with carbon at temperatures in excess of 850° C. to produce sodium cyanide in the following manner:

$$NaCNO + C \rightarrow NaCN + CO$$

Sodium cyanamid also will react with carbon to form sodium cyanide at a somewhat lower temperature than that required for the reduction of sodium cyanate. The equation of this reaction is as follows:

$$Na_2CN_2 + C \rightarrow 2NaCN$$

Sodium ferrocyanide, as is also well known, will yield sodium cyanide, on heating, in accordance with one or the other of the following reactions, depending on whether the ferrocyanide is heated alone or in the presence of an alkali carbonate.

$$Na_4Fe(CN)_6 \rightarrow 4NaCN + Fe + 2C + N_2$$
$$Na_4Fe(CN)_6 + Na_2CO_3 \rightarrow$$
$$5NaCN + NaCNO + Fe + CO_2$$

The alkali metal cyanate formed in case an alkali metal carbonate is present is of course, available for reduction to alkali metal cyanide.

From the foregoing discussion, it will be seen that the formation of these secondary products during the first stage of the process in no wise influences the final production of alkali metal cyanide, since each and every one of them may be readily converted to cyanide. In order to carry out this conversion, it is only necessary to add carbon in any convenient form; since carbon is required in two of the above-noted reactions for the reversion of the secondary products to cyanide; and then to heat the entire batch of material to a temperature sufficient to secure the simultaneous carrying out of the desired reactions. We have found a temperature of 900° C. to be satisfactory. A temperature of 850° C. or even lower may be used with entire success provided the heating is continued for a sufficient period, and conversely, a somewhat higher temperature may be used, if it is desired to hasten the reaction, without affecting the final product. The carbon reacts quite completely and it is only necessary to add a slight excess over the amount theoretically required. It may happen in some cases that, even in spite of skimming off carbon scum to prevent excessive foaming, a sufficient amount of carbon may yet remain in suspension in the molten material to effect the conversion of cyanates and cyanamids to cyanides. In such cases it is obvious that the further addition of carbon may be omitted. The final product is, of course, obtained in the liquid state, and if the process has been properly carried out will consist of nearly pure alkali metal cyanide, unless other non-reactive salts, such as chlorides, have been purposely added or unless such other non-reactive salts may have been present as impurities in the alkali metal carbonate or carbonates employed. Since it is desirable to use a slight excess of carbon, the final product will contain such excess carbon in suspension. This may be removed by settling and decantation or, more certainly, by filtration through a satisfactory filtering medium. A bed of porous iron forms a satisfactory filter for the filtration of fused cyanides as is already well known. The fused cyanide, with or without filtration, may be run into forms or moulds and allowed to solidify by cooling.

In order to make clearer the method of carrying out our process, we give herewith the following example of the preparation of a batch of sodium cyanide in accordance with our process. It is to be understood that this example is illustrative only and it is not to be taken as in any way limiting the scope of our invention, since many details of our process may be varied without departing from its essential features. Nor is the example given to be understood as limiting our process to the use of sodium carbonate, since other alkali metal carbonates will react similarly to produce the corresponding alkali metal cyanides.

For the purpose of fusing the alkali metal carbonate, (in this case sodium carbonate was used), we employed a cast metal melting pot with an approximately hemispherical bottom. This pot was of such size as to have a working capacity of 2500 to 2800 pounds of melted cyanide. This particular pot was composed of a heat-resistant alloy consisting essentially of a mixture of iron, nickel and chromium. We have found, however, that iron or steel melting pots may be used with equal success, the only difference being that they oxidize more rapidly on the outside and hence show a shorter life than a special, heat-resistant alloy. This pot was supported in a brick-work furnace and suitably heated by natural gas.

In this pot we placed 463 pounds of a somewhat crude commercial sodium cyanide, which contained, when melted, 87.8% of actual sodium cyanide. The principal impurity in this sodium cyanide was sodium carbonate. As soon as this sodium cyanide was fused, we began running hydrocyanic acid into it. The hydrocyanic acid was introduced through a copper tube which was protected from the action of sodium cyanide by an external sheath, consisting of an iron pipe, as described in detail elsewhere in these specifications. We do not know with certainty whether the hydrocyanic acid was entirely vaporized within the tube or whether a portion of it entered the fused batch in liquid form and was then vaporized by contact with the fused material, but consider the latter to have been more probable. As soon as the flow of hydrocyanic acid had been started, the addition of sodium carbonate to the batch was commenced. Commercial soda ash was used. The addition of soda ash was continued as rapidly as was possible without causing the batch to "freeze up," or become solid, through the chilling effect of the cold soda ash. We had found by previous experiments that this method of gradually adding the soda ash was somewhat more satisfactory than melting the batch as a whole, before commencing the addition of HCN, although the latter method may be practiced with equal success so far as the quality of the final product is concerned. 1809 pounds of soda ash was added in all. After the addition of soda was completed, we continued to pass in hydrocyanic acid. The addition of hydrocyanic acid was controlled by taking samples of fused material and analyzing them for sodium carbonate. As the addition of hydrocyanic acid proceeded the amount of carbonate present progressively decreased and when only 0.5% of sodium carbonate remained, the flow of hydrocyanic acid was stopped. The total amount of hydrocyanic acid (99–100% HCN) run in was 1,117 pounds.

To the batch was now added 51 pounds of pulverized hardwood charcoal. The batch was then heated to a temperature of 850° C. in order to carry out the conversion of sodium cyanate, sodium cyanamid and sodium ferrocyanide to sodium cyanide. A reasonable degree of care must be taken in carrying out this heating up of the batch, since if the heat is carried up too rapidly, particularly after 700° C. is reached, a considerable amount of foaming may take place which might result in overflowing the melting pot. This foaming is due to the evolution of gas and indicates that the desired reactions are taking place. During this stage of the process, a certain amount of sodium carbonate is regenerated due to side reactions. The batch was, therefore, cooled again to a temperature of 600° C. and a further addition of 149 pounds of hydrocyanic acid of the same grade of purity was made. The addition of this second quantity of hydrocyanic acid was controlled in the same manner, i. e., by taking samples and analyzing them for sodium carbonate. In this case the addition of hydrocyanic acid was continued until no sodium carbonate could be detected in the last sample taken. Since the batch was found to still contain sufficient carbon, no further addition of charcoal was made. The batch was then again heated, this time to 870° C., in order to convert sodium cyanate, sodium cyanamid and sodium ferrocyanide to sodium cyanide.

The finished product in the fused state showed the following analysis:

| | |
|---|---|
| NaCN | 94.8% |
| $Na_2CO_3$ | 3.9% |
| NaOH | 1.0% |
| NaCNO | .9% |
| $NaCN_2$ | Trace |
| $Na_4Fe(CN)_6$ | None |
| Water insoluble | .2% |
| $Na_2S$ | Trace |
| NaCl | .3% |

The fused material was filtered through a porous iron filter, in order to remove carbon, and was then allowed to solidify, by cooling. The finished product was perfectly white, of excellent appearance, and showed an analysis of 94.8% NaCN. A total weight of 1745 pounds of finished product was secured. In addition to this, there remained in the melting pot a residue of 185 pounds of a mixture of sodium cyanide and carbon containing 68.4% of sodium cyanide and an additional similar residue on top of the filter weighing 335 pounds and containing 31.0% of sodium cyanide. The sum of the weights of the finished product, plus the weights of these residues, was equivalent to 99.5% of the theoretical weight yield, based on the sum of the weights of sodium carbonate plus primer sodium cyanide employed. The total amount of sodium cyanide in the product, plus residues, corresponded to a yield of 67.3%, based on the hydrocyanic acid used. Other batches have resulted in efficiencies, based on HCN used, as high as 85% of the theoretical. We have succeeded in producing, by the process described, a finished product containing 98% of sodium cyanide.

The process as herein described can be employed to produce alkali metal cyanides from mixtures containing alkali metal carbonates and cyanides, and it can be employed, consequently, in increasing the cyanide content of impure cyanide materials where the principal impurity consists of an alkali metal carbonate. Low grade alkali metal cyanides can thus be converted into cyanides of relatively high purity. The operation of the process for this purpose need not be varied substantially from the operation described for the purpose of producing cyanides from alkali metal carbonates.

The preferred apparatus for the practice of the process is illustrated in the accompanying drawing, in which 5 indicates a converter which may be constructed of iron or steel but is made preferably of a heat-resistant alloy consisting essentially of iron, nickel and chromium. The latter material is preferred because it resists oxidation by the heating gases which contact with the exterior surface. The converter 5 is mounted in a suitable furnace 6 of brickwork and may be heated by suitable burners adapted to the combustion of gaseous, liquid or solid fuel. The converter is provided with a top 7 having a charging opening 8 and a cover 9. The hydrocyanic acid is introduced thru a pipe 10 which extends down nearly to the bottom of the converter.

At the conclusion of the operation, the molten cyanide is withdrawn through a pipe 11. The molten cyanide may be forced through the pipe 11 by closing the converter tightly and applying gaseous pressure from any suitable source. The molten cyanide is delivered by the pipe 11 into a filter 12 which may be constructed of iron, steel or the alloy of iron, nickel and chromium, and is mounted in another section of the furnace 6 which is also adapted to be heated by means of suitable burners. The filter is closed by a top 13 which is provided with a manhole 14 and a cover 15 to permit access for cleaning. The lower part of the filter is filled with a bed 16 of suitable filtering material such as iron turnings or borings. The molten cyanide passes through this bed to an outlet pipe 17, the solid impurities, principally carbon, being retained by the filter so that the molten cyanide can be withdrawn in a substantially pure condition. The cyanide is delivered by the pipe 17 to a casting apparatus or pellet machine in which the product is solidified in suitable form for commercial transportation and use.

Hydrocyanic acid very readily decomposes when exposed to heated iron. A large amount of carbon results from the decomposition and in the event that a tube composed simply of iron is used to introduce the hydrocyanic acid it would be quickly stopped up with a deposit of carbon. There would be in addition a loss of hydrocyanic acid resulting from the decomposition. Copper does not have this effect on hydrocyanic acid even when hot. Copper is, however, rapidly attacked by fused alkali metal cyanides. A plain copper tube is not adapted, therefore, for the introduction of the hydrocyanic acid into the charge.

We have found it desirable to use a composite tube for the purpose of introducing the hydrocyanic acid into the converter. The tube 10 is composed of an inner tube 18 of copper and an outer sheath 19 of iron. The inner tube of copper should not be exposed, however, to the melted cyanide and we employ, therefore, a tip 20 which is made of a material which neither decomposes hydrocyanic acid, nor is attached by fused alkali metal cyanides, for example, carbon. This tip is secured to the end of the copper tube and fits tightly against the iron sheath so that the fused cyanide cannot leak into the space between the iron and copper tubes and come in contact thereby with the copper. The outer sheath is not affected by the cyanide and the hydrocyanic acid is delivered through the copper tube and the carbon tip into the molten mass of alkali metal cyanide and carbonate without decomposition. We can, therefore substantially avoid destruction of the hydrocyanic acid within the tube and we avoid destruction of the tube whereby it is introduced to the molten bath. The apparatus is adapted, consequently, for successful and continued practice of the process.

The principal advantages of the process have been described herein and others will be readily apparent. Various changes can be made in the details of the operation and in the structure of the apparatus employed therein without departing from the invention.

We claim:—

1. The process of preparing alkali metal cyanides, which comprises introducing hydrocyanic acid into a molten mass containing an alkali metal compound capable of reacting therewith.

2. The process of preparing mixed alkali metal cyanides, which comprises introducing hydrocyanic acid into a molten mass, containing a mixture of alkali metal compounds capable of reacting therewith.

3. The process of preparing alkali metal cyanides, which comprises introducing hydrocyanic acid into a molten mass containing an alkali metal carbonate.

4. The process of preparing alkali metal cyanides, which comprises introducing hydrocyanic acid into a molten mixture of alkali metal compounds including an alkali metal carbonate.

5. The process of preparing alkali metal cyanides, which comprises maintaining a mass containing an alkali metal compound capable of reacting with hydrocyanic acid at the lowest temperature at which it will remain molten and introducing hydrocyanic acid into the molten mass.

6. The process of preparing alkali metal cyanides, which comprises maintaining a mass containing an alkali metal carbonate at the lowest temperature at which it will remain molten and introducing hydrocyanic acid into the molten mass.

7. The process of preparing alkali metal cyanides, which comprises maintaining a mixture of alkali metal compounds including an alkali metal carbonate at the lowest temperature at which it will remain molten and introducing hydrocyanic acid into the molten mixture.

8. The process of preparing alkali metal cyanides, which comprises heating a mass containing an alkali metal compound capable of reacting with hydrocyanic acid to a temperature between 550° and 650° C., at which it is molten and introducing hydrocyanic acid into the molten mass.

9. The process of preparing alkali metal cyanides, which comprises heating a mass containing an alkali metal carbonate to a temperature between 550° and 650° C., at which it is molten and introducing hydrocyanic acid into the molten mass.

10. The process of preparing alkali metal cyanides, which comprises heating a mixture of alkali metal compounds including an alkali metal carbonate to a temperature between 550° and 650° C., at which it is molten and introducing hydrocyanic acid into the molten mass.

11. The process of preparing alkali metal cyanides, which comprises heating a mass containing an alkali metal compound capable of reacting with hydrocyanic acid to a temperature at which it is molten, introducing hydrocyanic acid, adding carbon to the mass and raising the temperature of the mass to decompose products of the reaction other than the cyanide.

12. The process of preparing alkali metal cyanides, which comprises heating a mass containing an alkali metal carbonate to a temperature at which it is molten, introducing hydrocyanic acid, adding carbon to the mass and raising the temperature of the mass to decompose products of the reaction other than the cyanide.

13. The process of preparing alkali metal cyanides, which comprises heating a mixture of alkali metal compounds containing an alkali metal carbonate to a temperature at which it is molten, introducing hydrocyanic acid, adding carbon to the mass and raising the temperature of the mass to decompose products of the reaction other than the cyanide.

14. The process of improving the quality of alkali metal cyanides containing an alkali metal carbonate as an impurity, which comprises introducing hydrocyanic acid into a molten body of the impure cyanide.

15. The process of improving the quality of alkali metal cyanides, containing a mixture of alkali metal carbonates as an impurity, which comprises introducing hydrocyanic acid into a molten body of the impure cyanide material.

16. The process of improving the quality of alkali metal cyanides containing an alkali metal carbonate as an impurity, which comprises introducing hydrocyanic acid into a molten body of the impure cyanide, adding carbon to the molten mass and raising the temperature of the mass to decompose products of the reaction other than the cyanide.

17. The process of improving the quality of alkali metal cyanides containing an alkali metal carbonate as an impurity, which comprises introducing hydrocyanic acid into a body of the impure cyanide while the latter is maintained at a temperature between 550° and 650° C. at which it is molten.

In testimony whereof we affix our signatures.

ROBERT W. POINDEXTER, Jr.
PAUL T. DOLLEY.